E. E. LAWRENCE.
DOUGH CUTTER.
APPLICATION FILED FEB. 23, 1911.

1,032,070.

Patented July 9, 1912.

Witnesses:
Carl L. Choate.
Horace A. Crossman.

Inventor:
Edward E. Lawrence.
By Emery, Booth, James & Varney,
Attys.

UNITED STATES PATENT OFFICE.

EDWARD E. LAWRENCE, OF CAMBRIDGE, MASSACHUSETTS, ASSIGNOR TO LOOSE-WILES BISCUIT COMPANY, OF KANSAS CITY, MISSOURI, A CORPORATION OF MISSOURI.

DOUGH-CUTTER.

1,032,070.

Specification of Letters Patent.

Patented July 9, 1912.

Application filed February 23, 1911. Serial No. 610,315.

*To all whom it may concern:*

Be it known that I, EDWARD E. LAWRENCE, a citizen of the United States, and a resident of Cambridge, in the county of Middlesex and State of Massachusetts, have invented an Improvement in Dough-Cutters, of which the following description, in connection with the accompanying drawings, is a specification, like characters on the drawings representing like parts.

This invention relates to dough cutters and more particularly to means for preventing the formation of burs or fins upon the edges thereof.
In order that the principle of the invention may be clearly understood, I have disclosed one embodiment thereof in the accompanying drawing, wherein—

Figure 1:
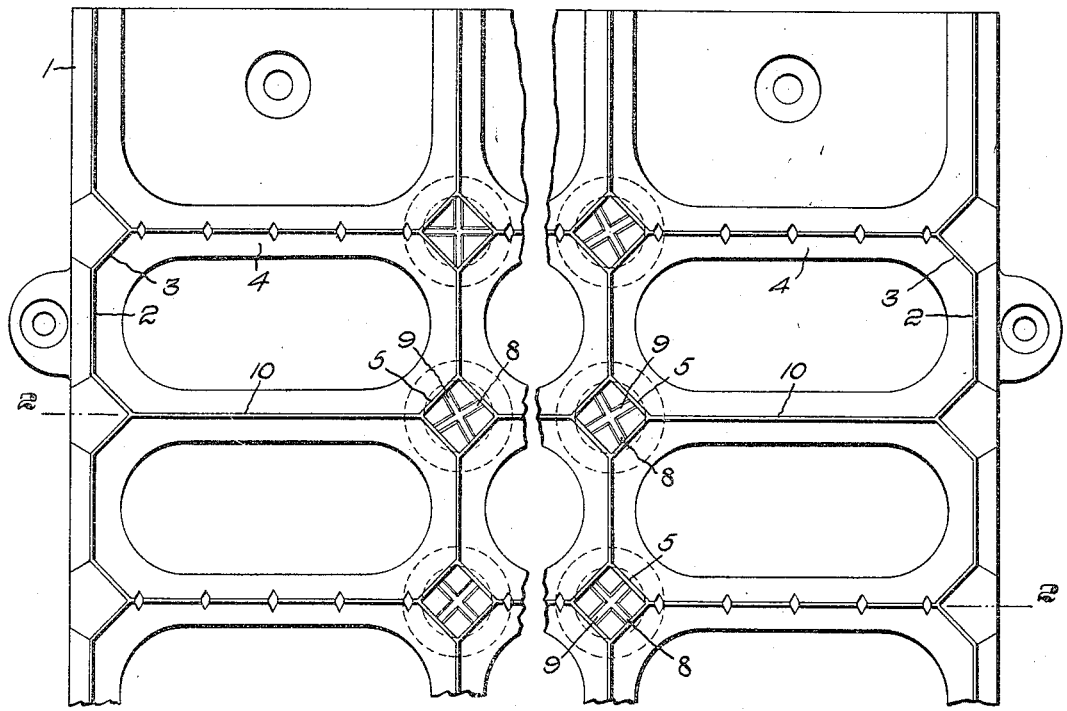
Figure 2:
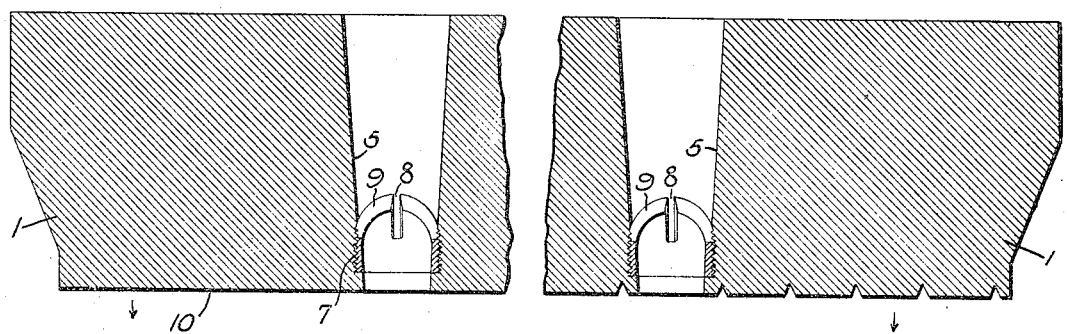
Figure 3:
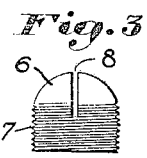
Figure 4:

Figure 1 is an underneath plan view of a cutter frame to which my invention is applied, parts thereof being broken away; Fig. 2 is a vertical section upon the irregular line 2—2 of Fig. 1; Fig. 3 is a side elevation of one feature of my invention; and Fig. 4 is a transverse section thereof.

While my invention is more particularly applicable to dough cutters used in the manufacture of crackers and the like, it is applicable to cutters used in the formation of most plastic material and more especially those of a somewhat resilient nature.

In the manufacture of crackers from dough, there is usually employed a cutter having a series of blades each conforming in shape to the outline of the cracker and each usually receiving within its boundary an ejector and docker pins. Customarily each cutter has a series of blades arranged in a plurality of parallel rows, so that each blade pertains to adjoining crackers. The outline of the blade is that of the cracker and is customarily of a general rectangular form. Heretofore crackers or the like cut from dough have been defective in that burs or fins of dough have in the cutting operation been impressed by the cutting blade upon the substance of the crackers and retained thereby, thus appearing in the baked article. This is more particularly the case where the cutting blades for adjoining crackers do not contact throughout their entire boundaries, but where spaces are left therebetween in which columns of dough accumulate in the operation of the cutter. In the operation of cutters thus constructed, the descent of the cutter upon the dough forces columns of dough into the spaces between adjoining blades, due to the pressure upon the mass of dough, and as the cutter is lifted the expansion or resiliency of the dough columns forces the lower ends of the columns out over the adjoining face of the blade, so that upon the next descent of the cutter a portion of this overflow or spread material is impressed upon the edges of the cracker and there retained in its baked condition as a bur, fin or projection.

Referring more particularly to the drawings, the cutter frame is represented at 1, it being provided with cutter blades 2, each being here shown as of a general oblong rectangular form having oblique corners 3. Within the confines of each cutter 2, the frame is provided with a flange 4 to receive the usual ejector (not shown), with which may coöperate the usual docker pins. Inasmuch as the blades are provided with the oblique portions 3, it follows that between four blades meeting at a common corner there is formed a diamond shaped opening 5, within which heretofore columns of dough have accumulated as the cutters descend upon the dough mass, reëxpanding as the cutter is elevated. The dough becomes packed in these passages 5 to a depth frequently of several inches and so tightly that it invariably expands and overflows as the cutter is elevated. In order to overcome this serious disadvantage, I have, in accordance with my invention, provided means to prevent the overflow or out-rush of any portion of this column of dough or other plastic material. It is evident that within the scope of my invention various devices may be employed to accomplish the desired result. I have herein illustrated a simple but effective form of my invention and which comprises means which constricts the columns of material as they are forced into the passages 5 and prevents their return. In Figs. 2, 3 and 4, I have illustrated a thimble or cap 6 preferably exteriorly threaded as indicated at 7, so that it may be secured in the threaded wall 7 of the passage 5, as illustrated in Fig. 2. Each cap or thimble is provided with a constricted passage, here shown as cross slots 8, 9. The general form of the cap or thimble is immaterial, but it is here represented as of a general dome shape arching away from the cutting face of the blade. The said caps may be positioned at any suitable point in the passages 5, but preferably quite closely adjacent the lower or cutting edge 10 of the blades 2, as indicated in Fig. 2.

It will be evident that as the cutter is forced downwardly or in the direction of the arrows in Fig. 2, the dough mass at the common corner of four adjoining crackers is forced upwardly into the cap or thimble 6 and through the constricted passages 8, 9 thereof, so that the cracker portion of the dough column is then positioned above said cap 6. As the cutter is lifted and the blades thereof are separated from the dough mass, it is evident that the column of dough that has been forced through the slots 8, 9 cannot force itself away back through said slots, but is retained wholly above the cap. The relatively small amount of dough that is contained within each cap is so slight that it cannot expand sufficiently to overflow the cutting edge 10 of the blade 2, and hence the formation of burs or fins is wholly or substantially wholly eliminated.

Each cap 6 acts somewhat in the manner of a check valve inasmuch as it permits the passage of the plastic mass beyond it, but prevents its return. It acts also as a small receptacle retaining a negligible amount of the dough, but preventing the return of the column supported thereabove.

It is, of course, obvious that the cracker or the like may be of any general form and that the shape of the passages 5 is, of course, dependent upon the contour or shape of the cracker. It is evident also that these columns of dough do not always occur at the corners of the adjoining crackers, but at points throughout the extent of the cutter, dependent upon the general structure thereof.

Each of the caps 6 constitutes one embodiment of partitions transversely positioned with respect to the dough column and constituting substantially abrupt abutments or walls to the dough column both above and below said caps or partitions. It will be noted, viewing Fig. 2, that the partitions or caps have concaved faces directed toward the cutting edges and that the entrance to the caps or pockets at their lower ends is of less cross sectional area than is said pocket at a point nearer the restricted openings. In this manner, a small quantity of dough is trapped or imprisoned between the ends of the caps and substantially held from being forced to the cutting edges of the blades. It will be noted that the passage or passages 8, 9 in the caps are slit-like.

It is evident from the foregoing description that the formation of burs or fins upon the edges of crackers or the like formed from dough or plastic material is wholly prevented, and that the same are therefore rendered more sightly and commercially acceptable. It is evident that the caps 6 may be readily cleaned from time to time and quickly removed for repair or other purpose.

Having thus described one illustrative embodiment of my invention, I desire it to be understood that although specific terms are employed, they are used in a generic and descriptive sense and not for purposes of limitation, the scope of the invention being set forth in the following claims.

Claims.

1. A dough or like cutter having outline blades with a series of intervening scrap receiving pockets and removable, perforated partitions for each of said pockets to retard the return exudation of the pocketed scrap.

2. A dough or like cutter having movement to and from the dough mass and provided with a gang of blades of general rectangular contour with interspersed corner pockets for scrap accumulation and caps threaded thereinto and perforated to permit passage of scrap upon cutting movement but preventing its return upon separation of the cutter and dough mass.

3. A dough or like cutter comprising a cutting frame having outline blades 2 with oblique corners 3 providing interspersed pockets 5 and independent caps 9 positioned therein and provided with restricted openings 8 for the purpose described.

4. A dough or like cutter having outline blades with intervening scrap receiving pockets, the face of each of said pockets that is the more remote from the cutting edges of the blades presenting a substantially abrupt abutment to the scrap column, thereby to prevent substantial return thereof to the cutting edges.

5. A dough or like cutter having outline blades with intervening scrap receiving pockets, said pockets having partitions provided with restricted openings, each of said partitions having a concaved face thereof directed toward the cutting edges.

6. A dough or like cutter having outline blades with intervening scrap receiving pockets, each of said pockets having a passage therethrough for the dough terminating in a restricted opening to prevent the return of the dough to said cutting blades, each of said passages between its ends being of greater cross sectional area than at its entrance opposite said restricted opening, thereby to trap material between said entrance and said retracted opening.

7. A dough or like cutter having outline blades with intervening scrap receiving pockets, each of said pockets having a cap positioned therein provided with slit-like passages for the passage of the dough away from the cutting blades or preventing substantial return of the dough to said blades.

8. A dough or like cutter having outline blades with intervening scrap receiving pockets, said pockets each having a terminal restricted opening to prevent substantial return of the dough, said openings being positioned at an abrupt angle with respect to a face or faces of said pockets.

9. A dough or like cutter having outline blades with intervening scrap receiving pockets and a partition for each of said pockets consisting of a relatively thin wall having a restricted opening therein, the opposite face of said wall presenting substantially abrupt abutments to the dough column.

10. A dough or like cutter having outline blades with intervening scrap receiving pockets, each of said pockets having a transverse partition provided with a restricted opening therein to prevent substantial return of dough but otherwise closing said pocket, said partitions presenting abutments to the dough columns that are abruptly disposed with respect thereto.

In testimony whereof, I have signed my name to this specification, in the presence of two subscribing witnesses.

EDWARD E. LAWRENCE.

Witnesses:
 RICHARD STIMPSON,
 CHARLES E. CLEMENTS.

---

Copies of this patent may be obtained for five cents each, by addressing the "Commissioner of Patents, Washington, D. C."